(12) United States Patent
Sadek et al.

(10) Patent No.: US 6,385,063 B1
(45) Date of Patent: May 7, 2002

(54) HYBRID FILTER FOR AN ALTERNATING CURRENT NETWORK

(75) Inventors: Kadry Sadek; Marcos Pereira, both of Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/720,337

(22) PCT Filed: Jun. 16, 1999

(86) PCT No.: PCT/DE99/01771

§ 371 Date: Dec. 22, 2000

§ 102(e) Date: Dec. 22, 2000

(87) PCT Pub. No.: WO99/67868

PCT Pub. Date: Dec. 29, 1999

(30) Foreign Application Priority Data

Jun. 23, 1998 (DE) .......................................... 198 27 755

(51) Int. Cl.⁷ ................................................ H02M 1/12
(52) U.S. Cl. ............................ 363/39; 363/40; 307/105
(58) Field of Search ............................... 363/39, 37, 38, 363/40, 41, 44, 45, 48; 307/105, 107; 323/207, 210

(56) References Cited

U.S. PATENT DOCUMENTS 5,731,965 A  3/1998  Cheng et al.
5,757,099 A * 5/1998  Cheng et al. ................ 307/105
5,910,889 A  6/1999  Larsen et al.

OTHER PUBLICATIONS

Japanese Patent Abstract JP 02262841, 1990–10–25.

Aufsatz, "Ein Regelverfahren zur aktiven Filterung in der Starkstromtechnik", von C. Filtermann, F. Hillenbrand und C. Landgraf, abgedruckt in der DE–Zeitschrift "Regelungstechnik", 1982, Heft 8, Seiten 263–270, Bild 2a, no date available.

Aufsatz "Application of Power Active Filters for Mitigation of Harmonics", adgedruckt im Tagungsband "Stockholm Powertech", Stockholm, Juni 1995, No Date.

* cited by examiner

*Primary Examiner*—Rajnikant B. Patel
(74) *Attorney, Agent, or Firm*—Morrison & Foerster LLP

(57) ABSTRACT

The invention relates to a hybrid for an AC mains system, with the hybrid filter having a passive and an active filter which are electrically connected in series, and with the active filter having a voltage source. According to the invention, a tuned filter, which is tuned to the rated frequency of the AC mains system, is electrically connected in parallel with the active filter. This results in a hybrid filter for an AC mains system, whose active filter is not loaded by the fundamental current component.

5 Claims, 6 Drawing Sheets

HYBRID FILTER FOR AN ALTERNATING CURRENT NETWORK

FIELD OF THE INVENTION

The invention relates to a hybrid filter for an AC mains system, with the hybrid filter having a passive and an active filter which are electrically connected in series, and with the active filter having a voltage source.

BACKGROUND OF THE INVENTION

Such a hybrid filter, but used for a DC mains system, is known from the article "Application of Power Active Filters for Mitigation of Harmonics", printed in the Proceedings of "Stockholm Powertech", Stockholm, June 1995. The active filter has a voltage source and generates voltages in order to eliminate harmonics in the mains system. For this purpose, this active filter is not connected directly to the mains system, but is electrically connected in series with a coupling circuit, which limits the current and voltage requirements for the active filter. This coupling circuit may be a transformer, a coupling capacitor, a tuned filter or a combination of these elements. In the Proceedings article, the active filter is linked to the DC mains system by means of a tuned filter and a transformer. Such a filter arrangement is also referred to as a hybrid filter.

A double filter is provided as the tuned filter. A double filter results in low impedances at a number of resonant frequencies and with a fundamental having a relatively low wattless component. Only the capacitor bank need be designed for high voltage, thus justifying the considerable cost advantage of a double filter.

The passive filter in an AC mains system is often also used for power-factor correction. The fundamental component of the filter current is thus relatively high, as is the case, for example, in a high-voltage DC transmission system (HVDC system). If an active filter is now connected in series with such a passive filter, this results in a high load on the active filter since the fundamental component also flows through the active filter. Such a load may result in the active filter being disconnected from the hybrid filter after a short time, in order to protect the semiconductor components in its pulsed-current converter. However, the semiconductor components may also be designed for the fundamental component of the filter current. This strategy has the disadvantages that, firstly, there are probably no commercially available semiconductor components which on the one hand have the desired current and voltage load capacity and on the other hand have a high switching frequency, and, secondly, that the active filter, and hence the hybrid filter, is very expensive, so that the cost-benefit ratio of such a hybrid filter is no longer economic.

The article "Ein Regelverfahren zur aktiven Filterung in der Starkstromtechnik" [A control method for active filtering for high-power technology] by C. Filtermann, F. Hillenbrand and C. Landgraf, printed in the German Journal "Regelungstechnik" [Control engineering], 1982, Issue 8, pages 263 to 270, proposes a concept on the basis of which the voltage source of the active filter is no longer loaded by the fundamental current. This concept is illustrated schematically in FIG. 2a of this article and comprises a parallel tuned circuit, which is electrically connected in parallel with the hybrid filter and is tuned to the mains system frequency. In consequence, the voltage source of the active filter is no longer loaded with the fundamental current, so that it only need be matched to the harmonics. However, additional measures are required for any power-factor correction that is necessary.

SUMMARY OF THE INVENTION

The invention is now based on developing such a known hybrid filter in such a way that the fundamental component of the filter current is kept remote from its active filter in a simple manner, while allowing power-factor correction to be carried out by its passive filter.

Since a filter which is tuned to the mains system frequency of the AC mains system is electrically connected in parallel with the active filter of the hybrid filter, the fundamental component of the filter current is dissipated to the reference potential. For this reason, this filter is also referred to as a dissipation path. This dissipation path represents approximately a short-circuit for the fundamental component of the filter current while, in contrast, it has a significant resistance in the active-filter frequency band. Since the fundamental component of the filter current of the hybrid filter flows through the dissipation path, the active filter is no longer loaded by this fundamental component, so that the active filter need be designed only for the harmonic currents which are to be eliminated. A hybrid filter which is known for a DC mains system can thus also be used for an AC mains system, by simple means, without any need to overdesign the active filter.

A tuned filter allows a very low impedance to be achieved at a resonant frequency, even if the fundamental wattless component of the filter circuit is relatively low. However, the filter can easily be mistuned if there is a mains-system frequency discrepancy or the capacitor capacitance changes due to temperature. This mistuning results in a considerable proportion of the fundamental component of the filter current flowing through the active filter. This load on the active filter can result in the active filter being disconnected from the hybrid filter. The hybrid filter can thus no longer carry out its task, thus making the cost-benefit ratio even worse.

In one particularly advantageous embodiment of this hybrid filter, a regulator arrangement is provided, is connected on the input side to two current transformers and is connected on the output side by means of an adder to a control input of the active filter, with one of the two current transformers being associated with the active filter, and with the other being associated with the passive filter. This regulator arrangement makes it possible to remove the proportion of the fundamental component of the filter current flowing through the active filter as a result of mistuning. This considerably reduces, or eliminates, the load on the active filter due to fundamental current components of the filter current during a transient process and during continuous operation, despite mistuning of the dissipation path.

Advantageous refinements of the hybrid filter according to the invention can be found in the dependent claims 3 to 5.

BRIEF DESCRIPTION OF THE DRAWINGS

The invention will be explained further with reference to the drawing, which schematically illustrates two embodiments of the hybrid filter according to the invention, and in which.

DETAILED DESCRIPTION OF THE INVENTION

Figure 1:
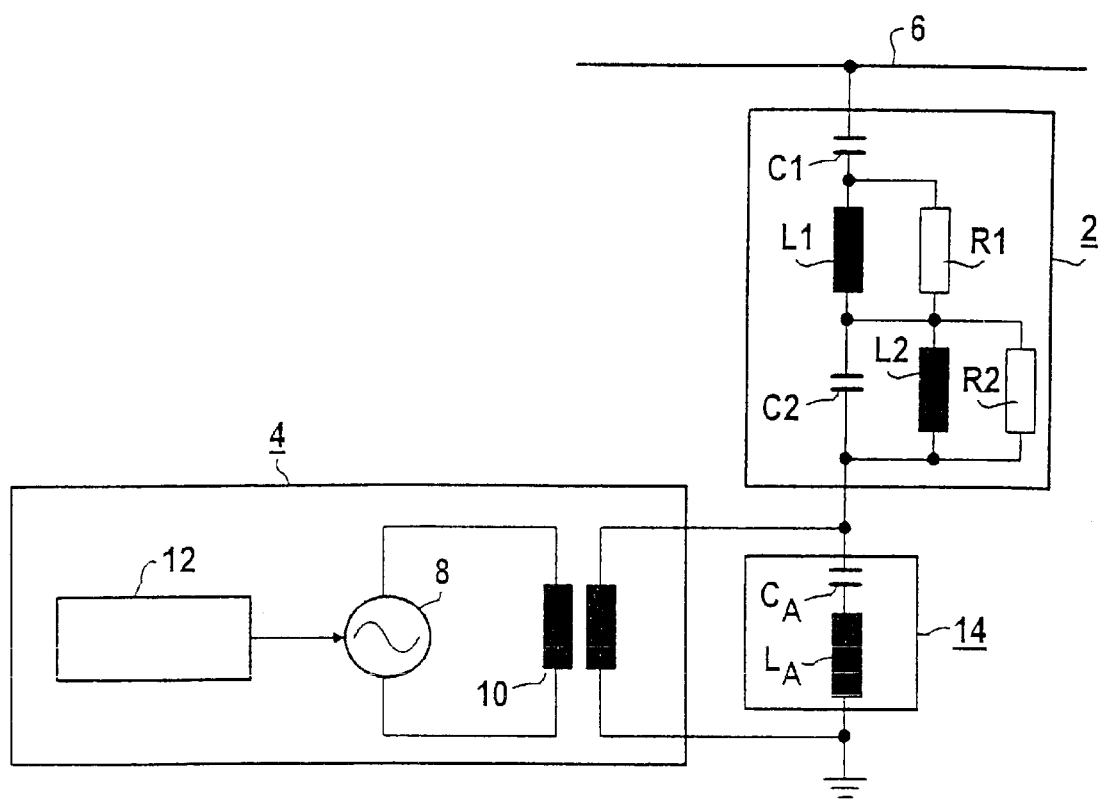
FIG. 1 shows a first embodiment of the hybrid filter according to the invention.

FIG. 1 shows a first embodiment of the hybrid filter according to the invention, which comprises a passive filter 2 and an active filter 4 which are electrically connected in series. The passive filter 2 is a double filter whose passive components C1, L1, R1 and C2, L2, R2 are tuned, for example, to the 11th and 13th harmonics and to the 23rd and 25th harmonics. Only the capacitor C1 is designed for the high-voltage level of the AC mains system 6 to which the hybrid filter is connected. The capacitor C1 is a capacitor bank, whose capacitor units are installed in racks.

The active filter 4 has a voltage source 8, a transformer 10 and a regulating device 12. According to the Proceedings article mentioned initially, the voltage source 8 comprises a pulse-width-modulated pulsed-current converter, which is linked on the DC side to a capacitor bank. Gate turn-off power semiconductor switches, in particular insulated gate bipolar transistors (IGBTs) are used as the semiconductor components for the pulsed-current converter. The regulating device 12 is in the form of a closed control loop, with the individual components of this regulating device being illustrated in FIG. 3 of the Proceedings article mentioned above, and being described in the associated text.

According to the invention, a tuned filter 14 is electrically connected to the active filter 4 and has a series circuit comprising a capacitor $C_A$ and an inductance $L_A$. These two elements $C_A$ and $L_A$ of the tuned filter 14, which is also referred to as the dissipation path, are chosen such that the dissipation path 14 has a very low impedance at the mains system frequency. In contrast, this dissipation path 14 has a high impedance in the frequency band of the active filter 4.

Figure 2:
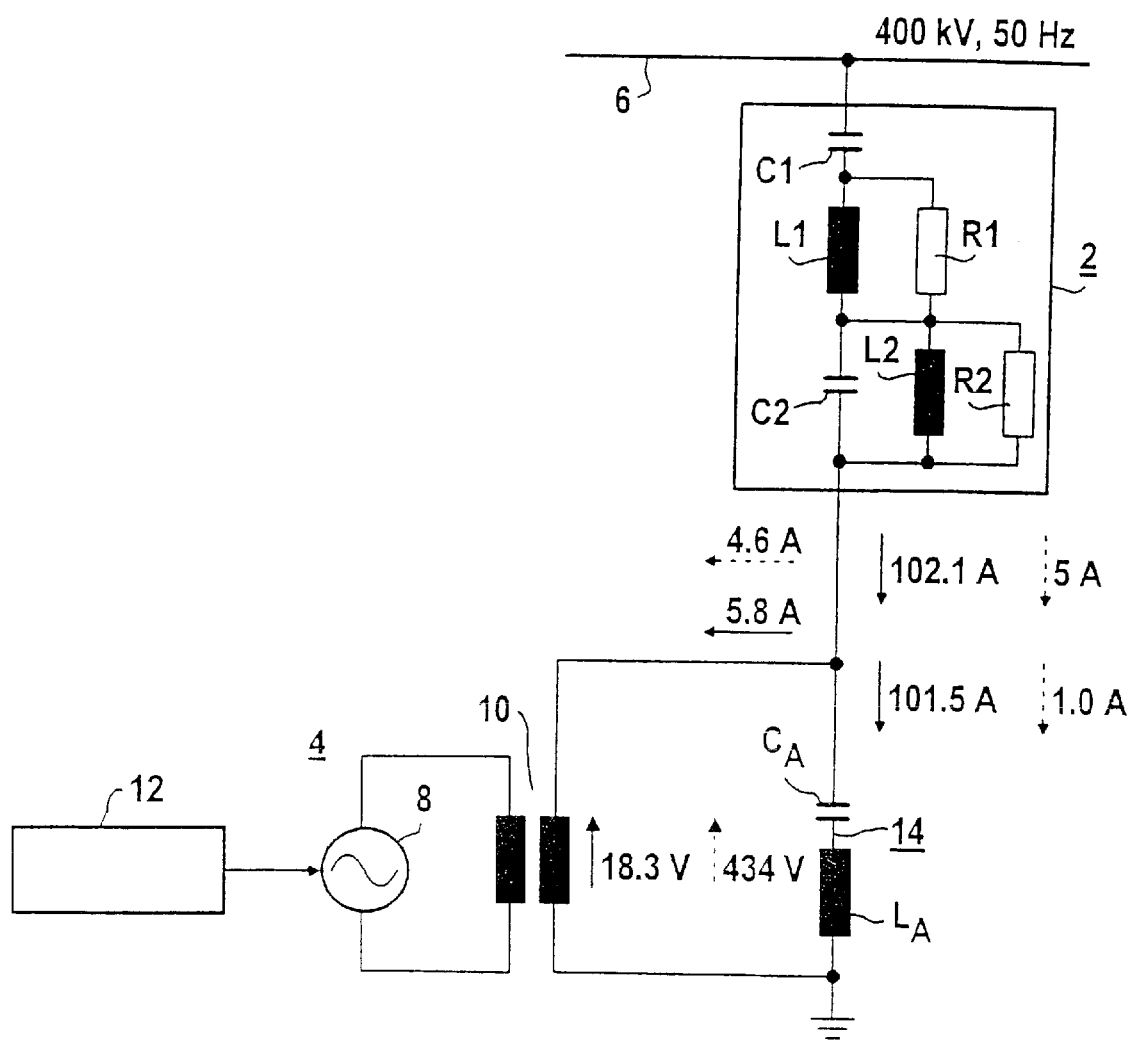
FIG. 2 shows an example in more detail.

In an exemplary embodiment shown in FIG. 2, the mains system 6 has a voltage level of 400 kV and a frequency of 50 Hz.

Furthermore the active filter 4 is intended to counteract the 23rd harmonic of the mains system voltage. The following values are assumed for the elements C1, L1, R1, C2, L2 and R2 of the passive filter 2, this being regarded as the ideal assumption:

$C1=1.4 \,\mu F, L1=25 \text{ mH}, R1=700\Omega$ $C2=2.5 \,\mu F, L2=14 \text{ mH}, R1=400\Omega.$ The capacitor $C_A$ in the dissipation path 14 has a value of 169 $\mu F$, and the inductance $L_A$ in this dissipation path 14 has a complex impedance with a real value of 0.18Ω and an imaginary value of 60 mH. In this illustration, the current and voltage levels for the fundamental are each represented by a solid arrow, and those of the harmonics are each represented by a dashed arrow.

On the assumption that the 23rd harmonic current which is intended to flow through the hybrid filter has a magnitude of 5 A, this results in the current and voltage levels shown in FIG. 2. These levels show that the fundamental component of the filter current flows predominantly through the dissipation path 14 while, in contrast, the 23rd harmonic current component flows through the active filter 4. If the tuned filter 14 which is electrically connected in parallel were not present, then all the fundamental component of the filter current would flow via the active filter 4. Since the inductance $L_A$ in this tuned filter 14 also has a resistive component, the fundamental component of the filter current is split on the basis of the reciprocal of the ratio of the parallel-connected resistors.

Figure 3:
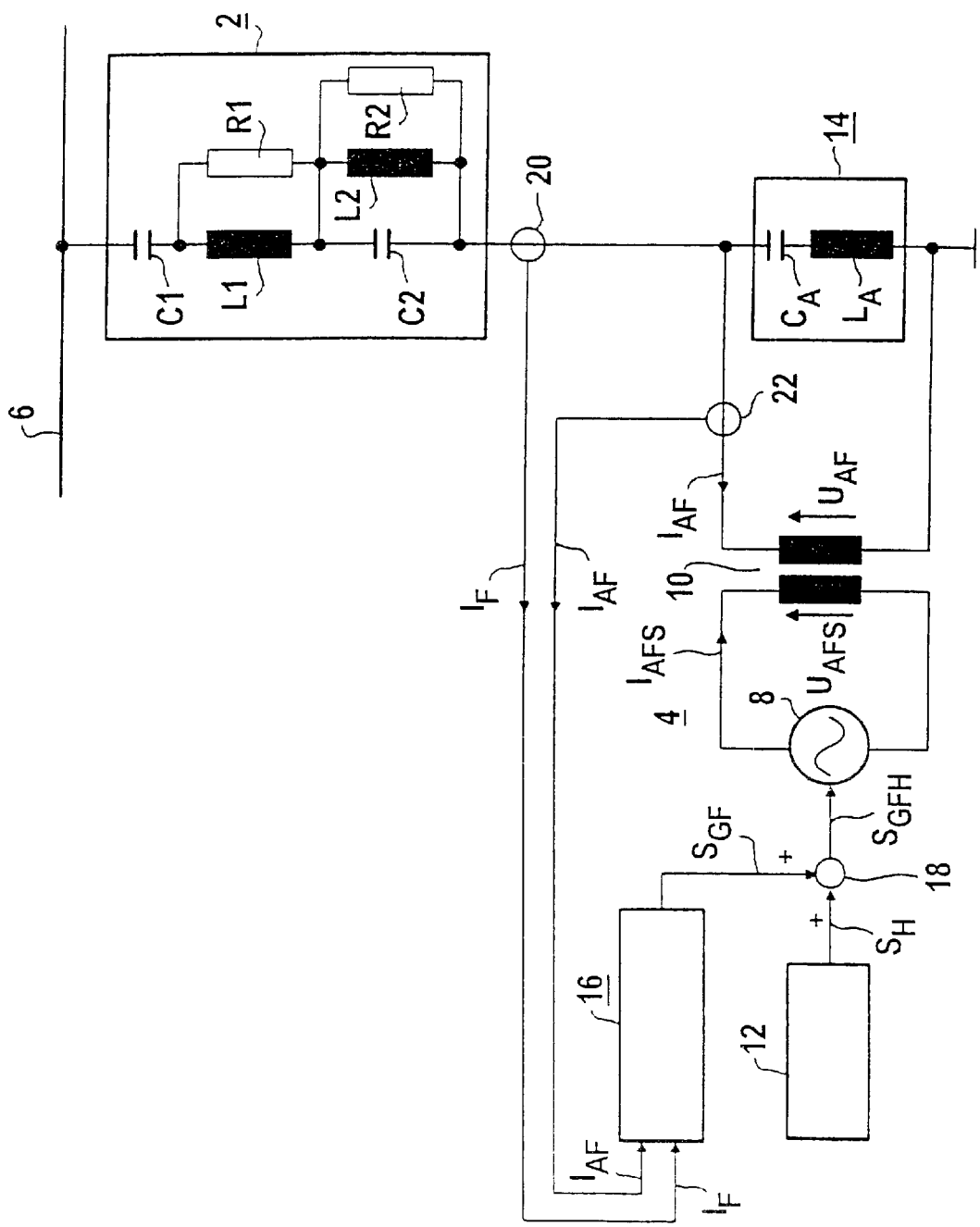
FIG. 3 shows a second embodiment of the hybrid filter according to the invention, with FIG. 4 showing a block diagram of a regulator arrangement of the hybrid filter shown in FIG. 3 in more detail, FIG. 5 being a graph illustrating the profile of the current in the active filter of the hybrid filter shown in FIG. 3 plotted against time t, and FIG. 6 showing the associated voltage profile in a graph plotted against time t.

This tuned filter 14 can be mistuned due to component tolerances and/or temperature changes, thus resulting in a considerable rise in the minimal proportion of the fundamental current component which flows through the active filter 4. In order to compensate for the proportion of the fundamental current component through the active filter 4, a regulator arrangement 16, an adder 18 and two current transformers 20 and 22 are provided in a second embodiment of the hybrid filter, as shown in FIG. 3. The current transformer 20 measures the filter current $I_F$ while, in contrast, the current transformer 22 measures the current component $I_{AF}$ through the active filter 4. The regulator arrangement 16, a simplified block diagram of which is shown in more detail in FIG. 4, uses these two currents $I_F$ and $I_{AF}$ which have been determined to determine a control signal $S_{GF}$. A sum control signal $S_{GFH}$ is produced from this control signal $S_{GF}$ by means of the adder 18 and the control signal $S_H$ of the regulating device 12 in the active filter 4, and this sum control signal $S_{GFH}$ is supplied to a control input of the voltage source 8 of the active filter 4.

Figure 4:
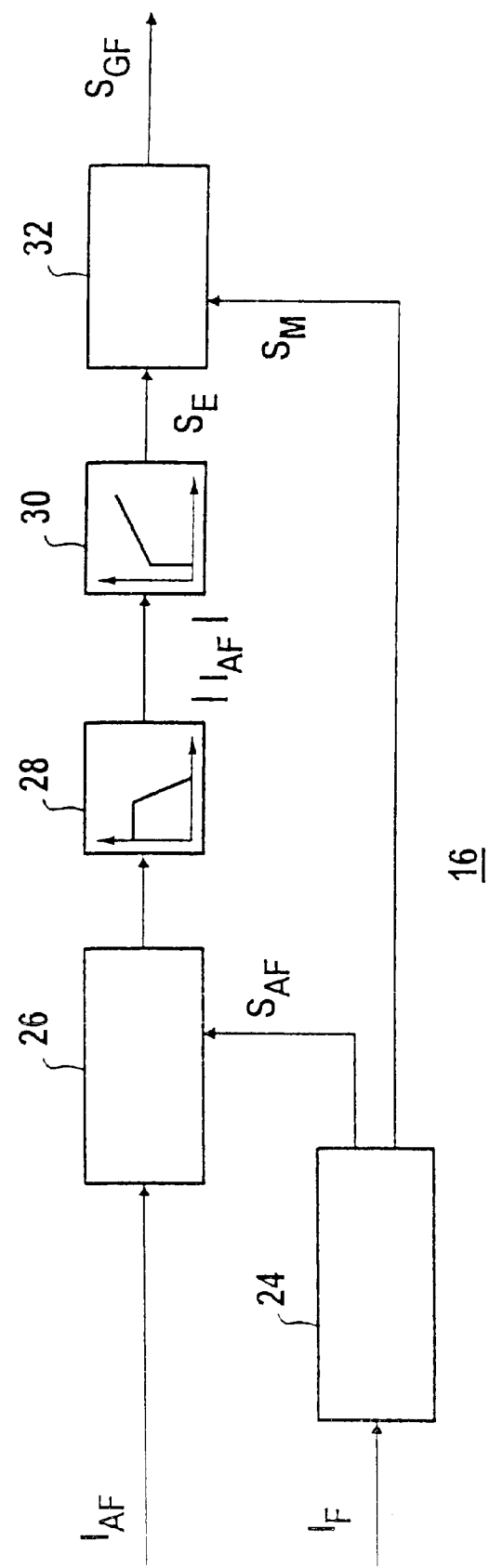

FIG. 4 shows a simplified block diagram of the regulator arrangement 16 in FIG. 3. This regulator arrangement 16 has a reference oscillator 24, a demodulator 26, a low-pass filter 28, a regulator 30 and a modulator 32. The reference oscillator 24 is linked on the input side to the output of the current transformer 20, and the demodulator 26 is linked on the input side to the output of the current transformer 22. On the output side, a first output of the reference oscillator 24 is connected to a further input of the demodulator 26, and a second output is connected to a further input of the modulator 32. On the output side, the demodulator 26 is linked by means of the low-pass filter 28 with a downstream regulator 30 to one input of the modulator 32, at whose output the control signal $S_{GF}$ is produced.

The reference oscillator 24, to whose input the measured filter current $I_F$ is applied, produces, firstly, a sinusoidal signal $S_{AF}$ with a constant magnitude and which is in phase with the measured filter current IF and, secondly, a second sinusoidal signal $S_M$, which likewise has a constant magnitude. The demodulator 26, to whose input the measured current $I_{AF}$ through the active filter 4 is applied, uses the sinusoidal signal $S_{AF}$ which is generated to produce a signal which is composed of a constant value and harmonics. The constant value corresponds to the magnitude $|I_{AF}|$ of the fundamental component of the current $I_{AF}$ through the active filter 4. The low-pass filter 28 is used to obtain this magnitude $|I_{AF}|$, which is supplied to the regulator 30, in particular a PI regulator. A reference signal $S_E$ is produced at the output of the regulator 30, and is used by the modulator 32 to produce the control signal $S_{GF}$ as a function of the sinusoidal signal $S_M$ which is generated. This control signal $S_{GF}$ is used to change the operating point of the voltage source 8 in such a way that the magnitude $|I_{AF}|$ tends to zero. As soon as the magnitude $|I_{AF}|$ has become zero, there is no longer any portion of the fundamental current component $I_F$ flowing through the active filter 4.

Figure 5:
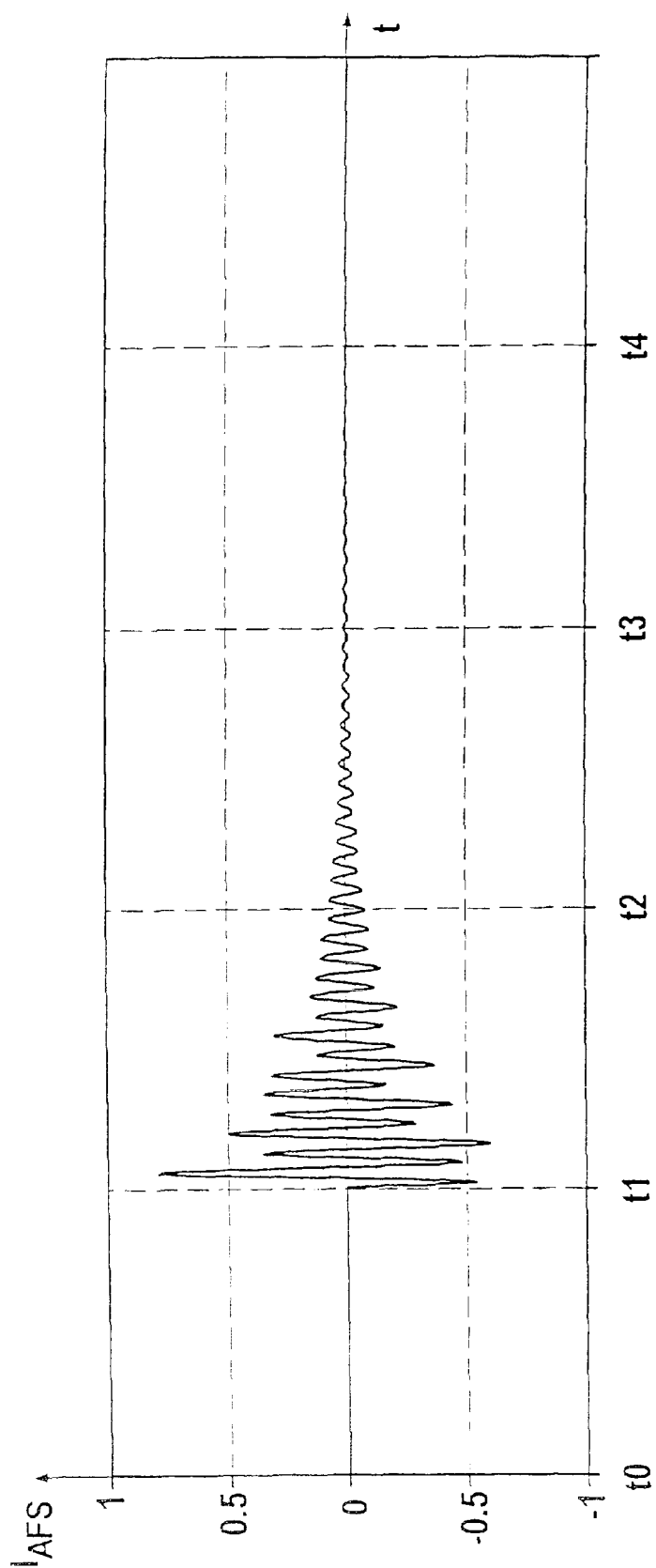
Figure 6:
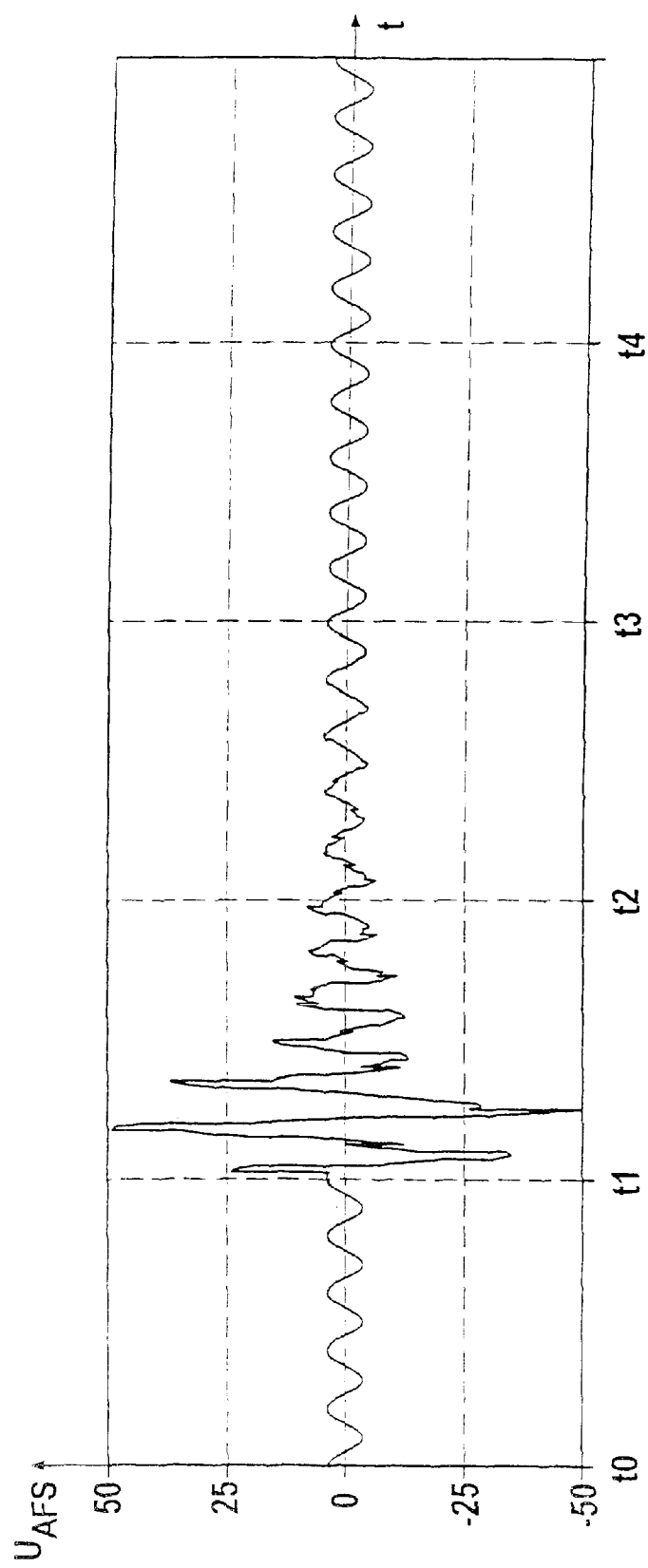

FIGS. 5 and 6 show the time profiles of the generated voltage $U_{AFS}$ of the active filter 4 and of the current component $I_{AFS}$ of the fundamental current component $I_F$ which flows through the active filter, in each case plotted in a graph against time t. These time profiles apply to mistuning of the dissipation path 14, with the value of the inductance $L_A$ having been mistuned by about 2%. Despite the mistuning of the dissipation path 14, the current $I_{AF}$ is zero in the time interval t1–t0. This result is achieved by the active filter 4 generating a voltage $U_{AFS}$ whose magnitude is minimal and whose frequency is equal to the mains system frequency. The mains system voltage changes at the time t1. This change in the mains system voltage results in the current component $I_{AFS}$ of the fundamental current component $I_F$ rising immediately and reaching a value of, for example, 750 A. This current component $I_{AFS}$ results in the voltage $U_{AFS}$ generated by the voltage source 8 of the active filter 4 changing, as a result of the change in the control signal $S_{GF}$ generated by the regulator arrangement 16, in such a manner that the current component $I_{AFS}$ of the fundamental current component $I_F$ becomes zero again at the time t3. The interval between the individual times t0 to t4 is in each case 0.1 seconds. Thus, the load which occurs on the active filter 4 as a result of a change in the main system 6 is regulated out after only 0.2 seconds. Without this regulator arrangement 16, the time to regulate out such a load would be very much longer. This time period depends on the time constants of the 50 Hz tuned circuit which is formed by the dissipation path 14, the transformer 10 and the voltage source 8 of the active filter 4. Furthermore, these two time profiles show that, even during continuous operation of the hybrid filter, the current component $I_{AF}$ of the fundamental current component $I_F$ is regulated to zero despite mistuning of the dissipation path 14. The active filter 4 of the hybrid filter is thus not loaded by any fundamental current component $I_F$ during continuous operation, even if the dissipation path 14 is mistuned.

Thus, just by using the dissipation path, a known hybrid filter for a DC mains system can also be used for an AC mains system without the active filter having to be overdesigned.

We claim:

1. A hybrid filter for an AC mains system, the hybrid filter having a passive and an active filter which are electrically connected in series, and the active filter having a voltage source, wherein a tuned filter, which is tuned to the rated frequency of the AC mains system, is electrically connected in parallel with the active filter.

2. The hybrid filter as claimed in claim 1, wherein a regulator arrangement, is connected on the input side to two current transformers and is connected on the output side by means of an adder to a control input of the voltage source of the active filter, with one of the two current transformers being associated with the active filter, and with the other being associated with the passive filter.

3. The hybrid filter as claimed in claim 1, wherein a double filter is provided as the passive filter.

4. The hybrid filter as claimed in claim 1, wherein the active filter has a pulse-width-modulated pulsed-current converter, which is linked on the DC side to a capacitor bank and is linked on the AC side to a transformer, and has a regulating device which is connected on the output side to a control input of the pulsed-current converter.

5. The hybrid filter as claimed in claim 2, wherein the regulator arrangement has a reference oscillator, a demodulator, a low-pass filter, a regulator and a modulator, and the demodulator is linked on the input side to an output of the current transformer of the active filter, and the reference oscillator is linked on the input side to an output of the current transformer of the passive filter, and a first output of the reference oscillator is connected to a further input of the demodulator, and a second output of the reference oscillator is connected to a further input of the modulator, and one output of the demodulator is linked by means of the low-pass filter to one input of the regulator, which is connected on the output side to one input of the modulator.

* * * * *